(12) United States Patent
Daikuhara et al.

(10) Patent No.: US 9,075,208 B2
(45) Date of Patent: Jul. 7, 2015

(54) METHOD FOR ASSEMBLING A PHOTOELECTRIC CONVERSION MODULE

(75) Inventors: Osamu Daikuhara, Shinagawa (JP); Yuko Ohse, Shinagawa (JP); Shigeyuki Takizawa, Shinagawa (JP); Toshio Hashi, Shinagawa (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 1331 days.

(21) Appl. No.: 11/700,792

(22) Filed: Feb. 1, 2007

(65) Prior Publication Data
US 2008/0007930 A1    Jan. 10, 2008

(30) Foreign Application Priority Data

Jul. 6, 2006 (JP) ................. 2006-186883
Jul. 6, 2006 (JP) ................. 2006-186884
Jul. 6, 2006 (JP) ................. 2006-186885

(51) Int. Cl.
H05K 3/30        (2006.01)
G02B 6/42        (2006.01)

(52) U.S. Cl.
CPC ........... *G02B 6/4227* (2013.01); *Y10T 29/5313* (2013.01); *Y10T 29/49137* (2013.01); *G02B 6/421* (2013.01); *G02B 6/4214* (2013.01); *G02B 6/4224* (2013.01); *G02B 6/4246* (2013.01)

(58) Field of Classification Search
CPC ............ B81C 3/004; B81C 2203/051; G02B 6/12004; G02B 6/4224; G02B 6/4204; G02B 6/4293; H01L 21/67259; H01L 20/681; H01L 25/167; H01L 27/15; H01L 31/125; H05S 5/026; H05K 3/303; Y10T 29/49137
USPC ........ 29/832–834, 836, 712, 739; 257/81, 84; 385/14, 15, 32, 88–90, 92; 438/31
See application file for complete search history.

(56) References Cited

U.S. PATENT DOCUMENTS 6,269,209 B1    7/2001   Terada et al.
6,316,281 B1 *  11/2001  Lee et al. ................. 385/14
(Continued)

FOREIGN PATENT DOCUMENTS

CN     1469148    1/2004
EP     0 762 169  3/1997
(Continued)

OTHER PUBLICATIONS

Partial European Search Report, mailed Jun. 22, 2007 and issued in corresponding European Patent Application No. 07101450.0-2216.
Y. Inoue et al., "PLC Hybrid Integrated WDM Transceiver Module for Access Networks", NTT Review, Telecommunications Association, Tokyo, Japan, vol. 9, No. 6, Nov. 1997, p. 55-64.
(Continued)

*Primary Examiner* — Peter DungBa Vo
*Assistant Examiner* — Jeffrey T Carley
(74) *Attorney, Agent, or Firm* — Staas & Halsey LLP (57) ABSTRACT

A method of assembling a photoelectric conversion module is disclosed. The photoelectric conversion module includes a circuit board on which are mounted a light emitting element, a light receiving element, and an optical element optically connected to the light emitting element and the light receiving element. The light emitting element is positioned on the circuit board based on a positioning mark formed on the circuit board beforehand. The light receiving element and the optical element are positioned based on a position of a light emission point of the light emitting element.

6 Claims, 10 Drawing Sheets

(56) References Cited

U.S. PATENT DOCUMENTS

| | | | |
|---|---|---|---|
| 6,711,186 B2 * | 3/2004 | Komeda | 372/29.02 |
| 6,938,335 B2 * | 9/2005 | Kuribayashi et al. | 29/834 |
| 6,955,481 B2 * | 10/2005 | Colgan et al. | 385/14 |
| 7,070,339 B2 | 7/2006 | Nagasaka et al. | |
| 2003/0147594 A1 | 8/2003 | Stayt et al. | |
| 2004/0005119 A1 | 1/2004 | Han et al. | |
| 2005/0058408 A1 | 3/2005 | Colgan et al. | |

FOREIGN PATENT DOCUMENTS

| | | |
|---|---|---|
| EP | 1 329 754 | 7/2003 |
| JP | 04-211208 | 8/1992 |
| JP | 04-237005 | 8/1992 |
| JP | 11-305082 | 11/1999 |
| JP | 11-345987 | 12/1999 |
| JP | 2002-031747 | 1/2002 |
| JP | 2002-357748 | 12/2002 |
| JP | 2003-158327 | 5/2003 |
| JP | 2003-322770 | 11/2003 |
| JP | 2004-317629 | 11/2004 |
| JP | 2005-115346 | 4/2005 |

OTHER PUBLICATIONS

Extended European Search Report, mailed Sep. 5, 2007 and issued in corresponding European Patent Application No. 07101450.0-2216.
Patent Abstracts of Japan Publication No. 11-305082, published Nov. 5, 1999.
Patent Abstracts of Japan, Publication No. 2005-115346, published Apr. 28, 2005.
Patent Abstracts of Japan, Publication No. 2002-031747, published Jan. 31, 2002.
Patent Abstracts of Japan, Publication No. 04-237005, published Aug. 25, 1992.
Patent Abstracts of Japan, Publication No. 04-211208, published Aug. 3, 1992.
Patent Abstracts of Japan, Publication No. 11-345987, published Dec. 14, 1999.
Japanese Patent Office Action dated Apr. 5, 2011 in Appln. 2006-186885.
Japanese Patent Office Action dated Apr. 5, 2011 in Appln. 2006-186884.
English Abstract of Japanese Publication No. 2003-322770, Published Nov. 14, 2003.
English Abstract of Japanese Publication No. 2004-317629, Published Nov. 11, 2004.
English Abstract of Japanese Publication No. 2003-158327, Published May 30, 2003.

* cited by examiner

METHOD FOR ASSEMBLING A PHOTOELECTRIC CONVERSION MODULE

BACKGROUND OF THE INVENTION

1. Field of the Invention

The present invention relates generally to photoelectric conversion modules, assembling methods thereof, high-speed transmission connectors, and mounting systems, and more particularly to a photoelectric conversion module, an assembling method thereof, a high-speed transmission connector, and a mounting system for connecting a telecommunication line and an optical communication line.

2. Description of the Related Art

Conventional transmission lines employed as global standard interfaces for standards such as 10GFC and 10GBASE-CX4 have limitations in that the transmission distance is short, at around 20 m.

Accordingly, methods have been proposed for increasing the transmission distance by combining high-speed transmission lines with optical transmission lines using these interfaces.

However, conventional photoelectric conversion units installed in transceivers used for optical communication are large and expensive. The photoelectric conversion units need to be turned into modules and reduced in size.

SUMMARY OF THE INVENTION

The present invention provides a photoelectric conversion module, an assembling method thereof, a high-speed transmission connector, and a mounting system in which one or more of the above-described disadvantages is eliminated.

A preferred embodiment of the present invention provides a photoelectric conversion module that can be made compact, an assembling method thereof, a high-speed transmission connector having the photoelectric conversion module mounted therein, and a mounting system.

An embodiment of the present invention provides a method of assembling a photoelectric conversion module including a circuit board on which are mounted a light emitting element, a light receiving element, and an optical element optically connected to the light emitting element and the light receiving element, the method including the steps of (i) positioning the light emitting element on the circuit board based on a positioning mark formed on the circuit board beforehand; (ii) positioning the light receiving element based on a position of a light emission point of the light emitting element positioned at step (i); and (iii) positioning the optical element based on the position of the light emission point of the light emitting element positioned at step (i).

An embodiment of the present invention provides a method of assembling a photoelectric conversion module including a circuit board on which are mounted a light emitting element, a driver IC that drives the light emitting element, a light receiving element, a receiver IC that receives signals from the light receiving element, and an optical element optically connected to the light emitting element and the light receiving element, the method including the steps of (i) mounting bare chips on the circuit board, wherein the light emitting element, the driver IC, the light receiving element, and the receiver IC are the bare chips; (ii) covering the bare chips with the optical element; and (iii) sealing a periphery of the optical element with a resin so that the bare chips are sealed by the optical element and the resin.

An embodiment of the present invention provides a mounting system for mounting on a circuit board a light emitting element, a light receiving element, and an optical element optically connected to the light emitting element and the light receiving element, the mounting system including an imaging device configured to pick up an image of a stage on which the circuit board is mounted; a mounting device configured to mount the light emitting element, the light receiving element, and the optical element on the circuit board; and a control device configured to recognize, based on the image picked up by the imaging device, a positioning mark formed on the circuit board beforehand, cause the mounting device to position the light emitting element on the circuit board based on the recognized positioning mark, recognize, based on the image picked up by the imaging device, a position of a light emission point of the light emitting element positioned by the mounting device, cause the mounting device to position the light receiving unit on the circuit board based on the recognized position of the light emission point, and cause the mounting device to position the optical element on the circuit board based on the recognized position of the light emission point.

An embodiment of the present invention provides a photoelectric conversion module including an electric connector to which a telecommunication line is to be connected; a circuit board mounted with a converting unit configured to convert an electric signal supplied to the electric connector from the telecommunication line into an optical signal to be supplied to an optical communication line, and convert an optical signal supplied from the optical communication line into an electric signal to be supplied to the telecommunication line via the electric connector; and a waveguide configured to connect the converting unit and the optical communication line; wherein the circuit board is a single board, and the electric connector and the waveguide are mounted on the circuit board.

An embodiment of the present invention provides a photoelectric conversion module including a circuit board, a light emitting element, a driver IC that drives the light emitting element, a light receiving element, a receiver IC that receives signals from the light receiving element, and a waveguide member optically connected to the light emitting element and the light receiving element, wherein the light emitting element, the driver IC, the light receiving element, and the receiver IC are bare chips and are mounted on the circuit board as the bare chips, the waveguide member covers the bare chips, and a periphery of the waveguide member is sealed with a resin so that the bare chips are sealed by the waveguide member, the circuit board, and the resin.

According to one embodiment of the present invention, a photoelectric conversion module that can be made compact, an assembling method thereof, a high-speed transmission connector having the photoelectric conversion module mounted therein, and a mounting system are provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE EMBODIMENTS

A description is given, with reference to the accompanying drawings, of embodiments of the present invention.

Figure 1:
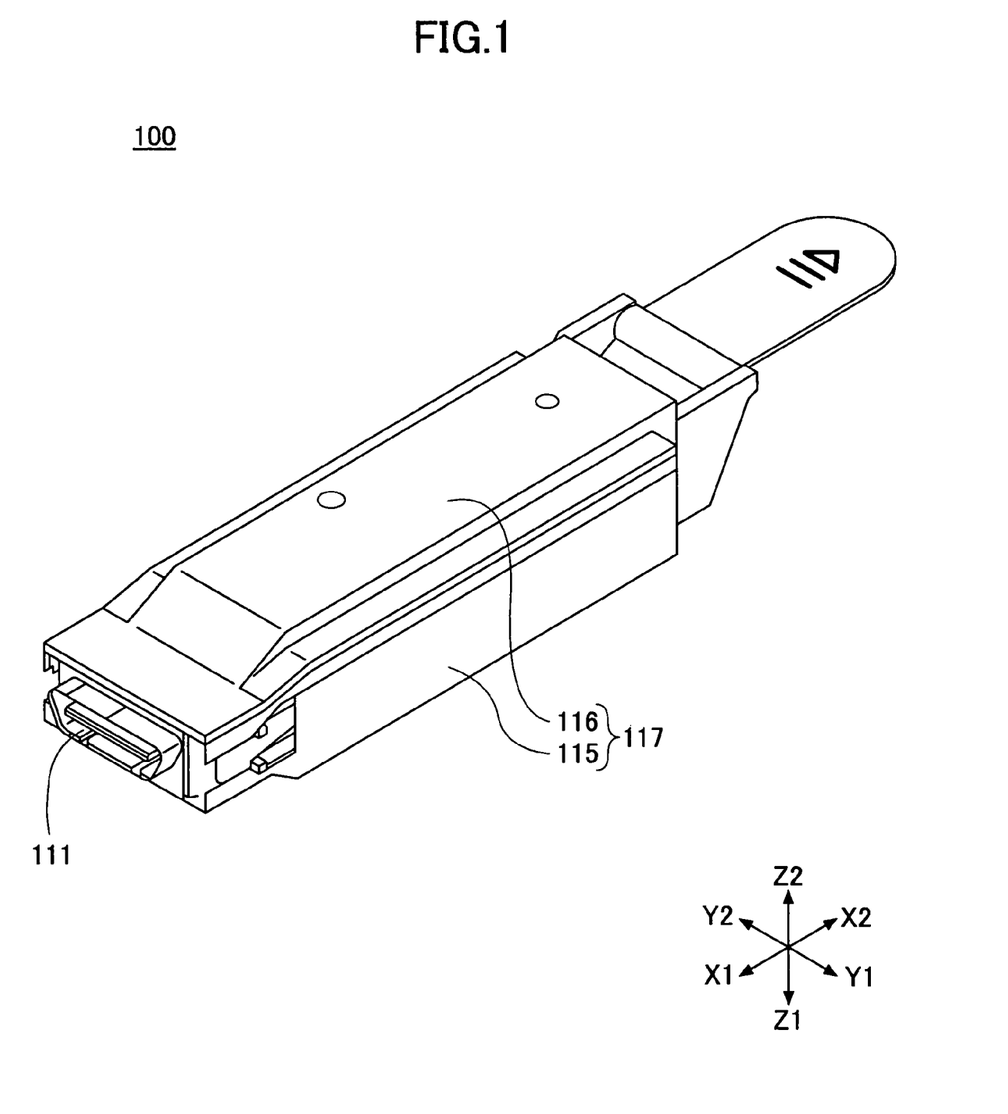
FIG. 1 is a perspective view of an embodiment of the present invention.
Figure 2A:
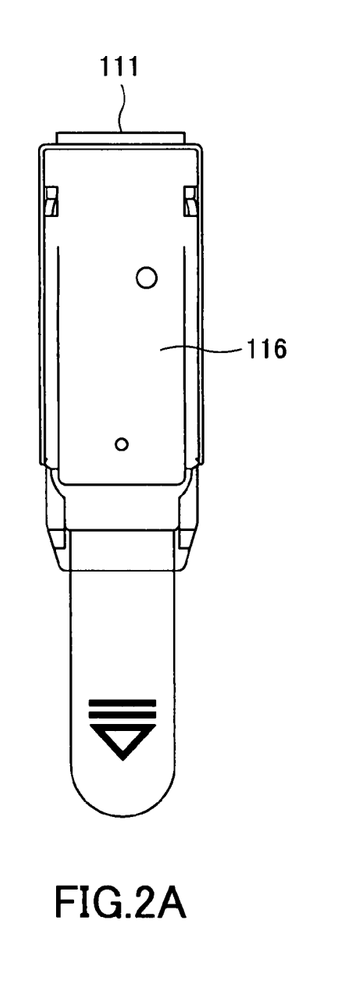
FIGS. 2A-2D are schematic diagrams of an embodiment of the present invention.
Figure 2B:
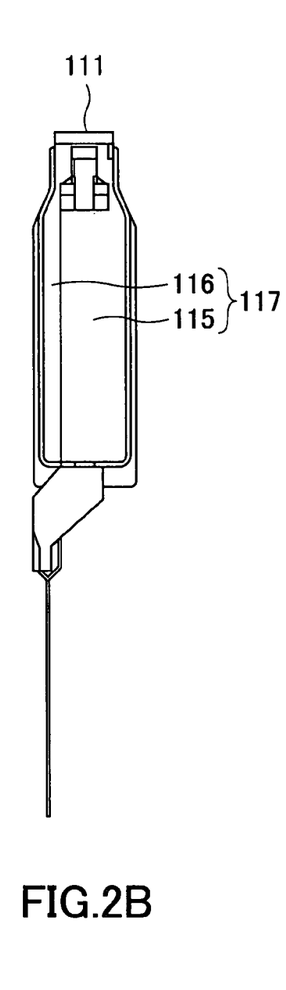
Figure 2C:
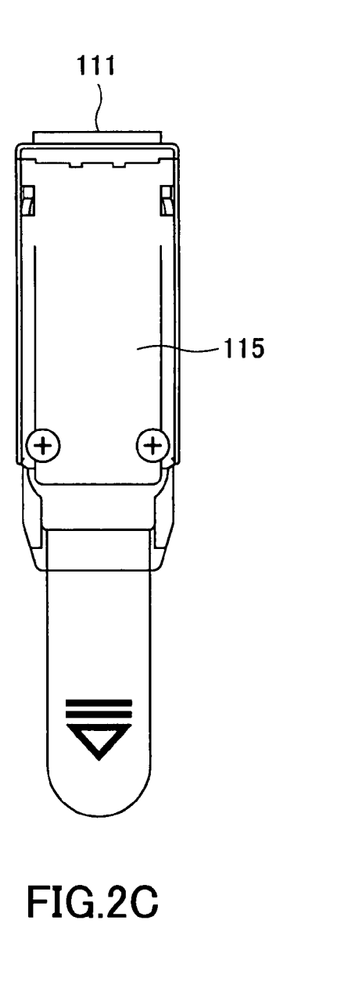
Figure 2D:
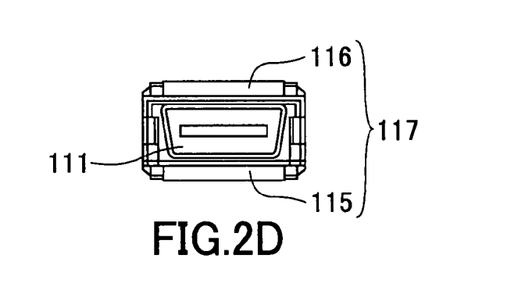
Figure 3:
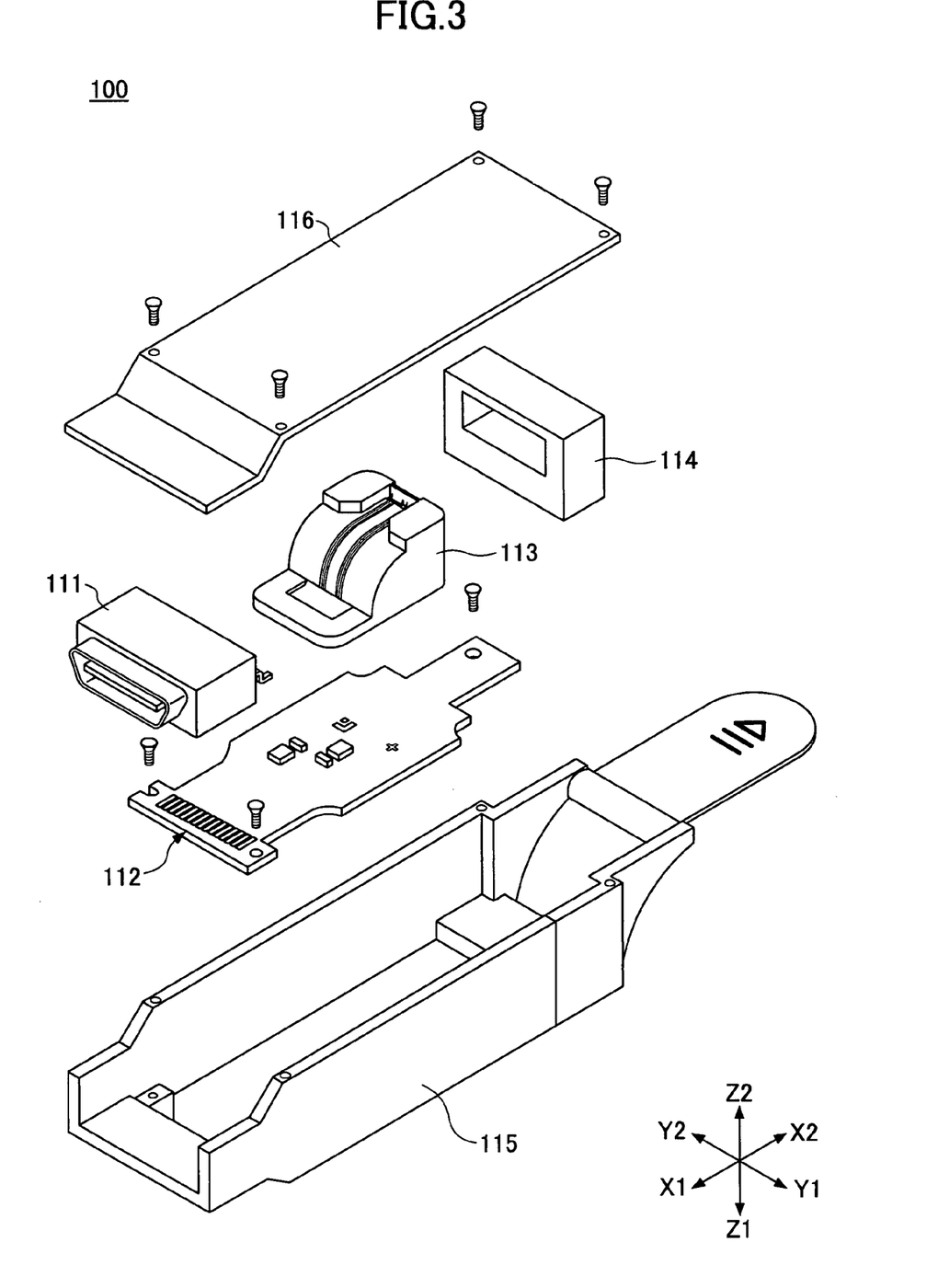
FIG. 3 is an exploded perspective view of an embodiment of the present invention.
Figure 4:
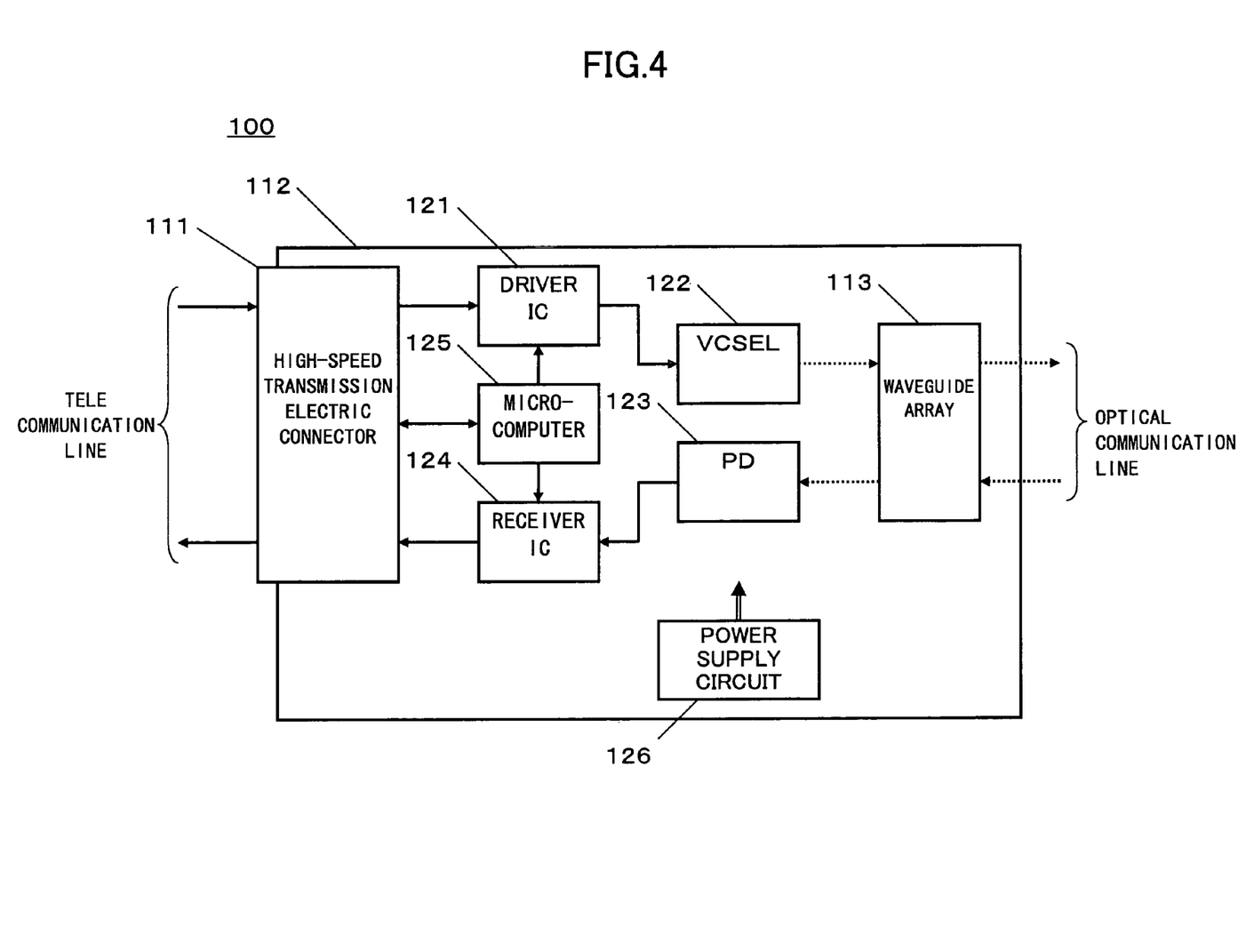
FIG. 4 is a block diagram of an embodiment of the present invention.

FIG. 1 is a perspective view of an embodiment of the present invention, FIGS. 2A-2D are schematic diagrams of an embodiment of the present invention, FIG. 3 is an exploded perspective view of an embodiment of the present invention, and FIG. 4 is a block diagram of an embodiment of the present invention.

A high-speed transmission connector 100 according to an embodiment of the present invention includes an electric connector 111, a circuit board 112, a waveguide array 113, and an optical socket connector 114, which are housed in a housing 117. The housing 117 includes a case 115 and a cover 116. The housing 117 is thus a sealed container within which built-in circuits are sealed.

The electric connector 111 is, for example, a socket connector, which is used for performing high-speed balanced transmission. The electric connector 111 is soldered and surface mounted onto one side of the circuit board 112 at one edge. A plug connector attached to a high-speed balanced transmission cable is to be inserted in the electric connector 111. The electric connector 111 supplies electric signals received from the high-speed balanced transmission cable to the circuit board 112, and also supplies electric signals received from the circuit board 112 to the high-speed balanced transmission cable.

Figure 5:
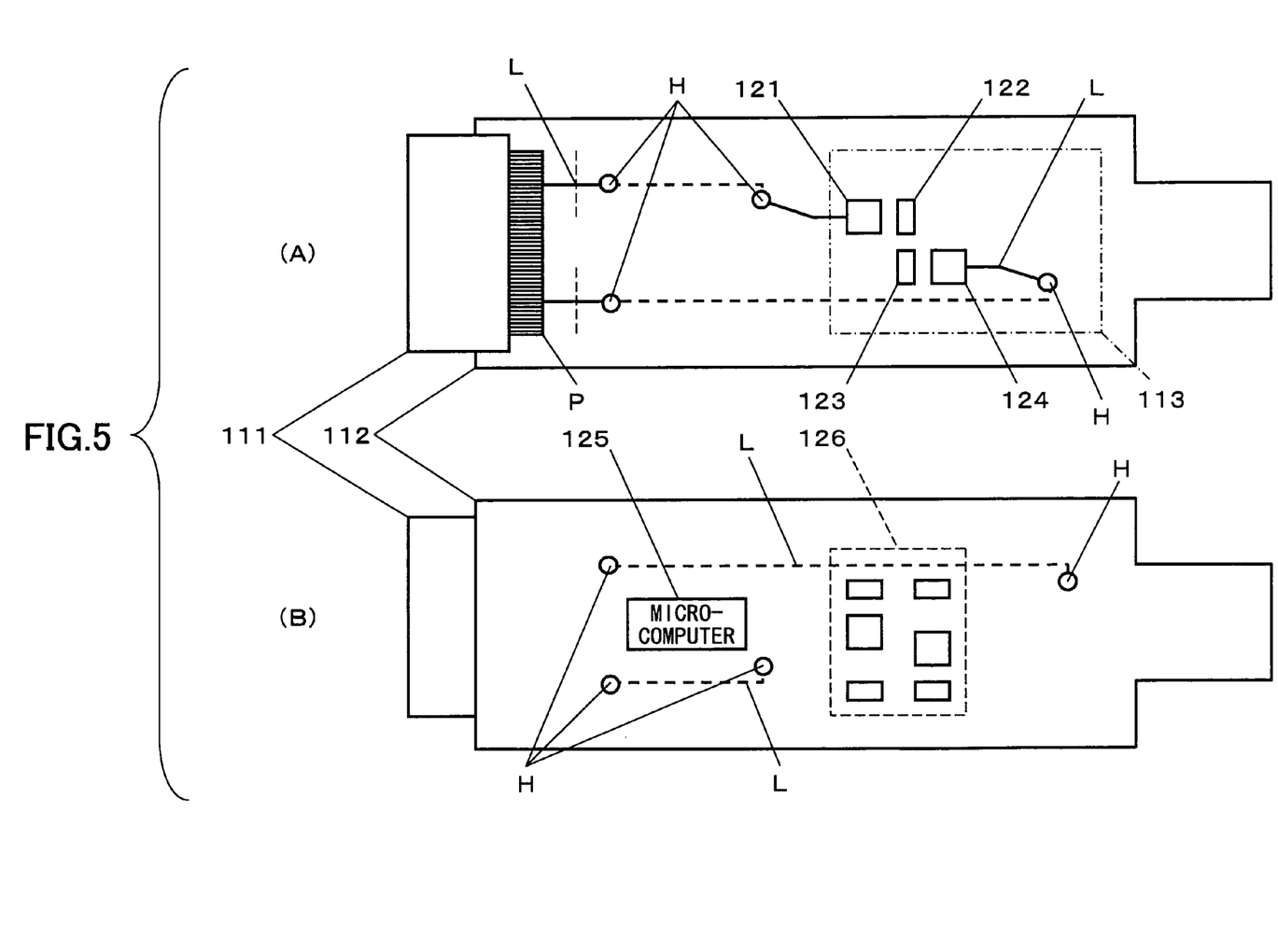
FIG. 5 is a schematic diagram of a circuit board.

FIG. 5 is a schematic diagram of the circuit board 112.

The circuit board 112 is configured by, for example, one multilayer printed wiring board. On one side of the circuit board 112, the electric connector 111, a driver IC 121, a light emitting element 122, a light receiving element 123, a receiver IC 124, and the waveguide array 113 are surface mounted. On the other side of the circuit board 112, various IC and chip components configuring a microcomputer 125 and a power supply circuit 126 are surface mounted.

The electric connector 111 is soldered to a pad P formed at the edge of the circuit board 112 in the direction denoted by an arrow X1. The pad P is connected to the driver IC 121, the receiver IC 124, the microcomputer 125, and the power supply circuit 126 via a balanced transmission pattern L. The balanced transmission pattern L is connected to the driver IC 121, the receiver IC 124, the microcomputer 125, and the power supply circuit 126 via through holes H and through a middle layer of the circuit board 112.

The paths of the balanced transmission pattern L are adjusted in a middle layer of the circuit board 112. For example, the paths are adjusted so that the wiring distance between the pad P and the driver IC 121 and the wiring distance between the pad P and the receiver IC 124 are substantially the same. Accordingly, the transmission properties can be made uniform between plural balanced transmission lines for transmission and plural balanced transmission lines for reception. Therefore, other adjustments are not necessary for making transmission properties uniform between balanced transmission lines at the circuit board 112. As a result, the number of components can be reduced, such that the circuit board 112 can be made compact.

Figure 6:
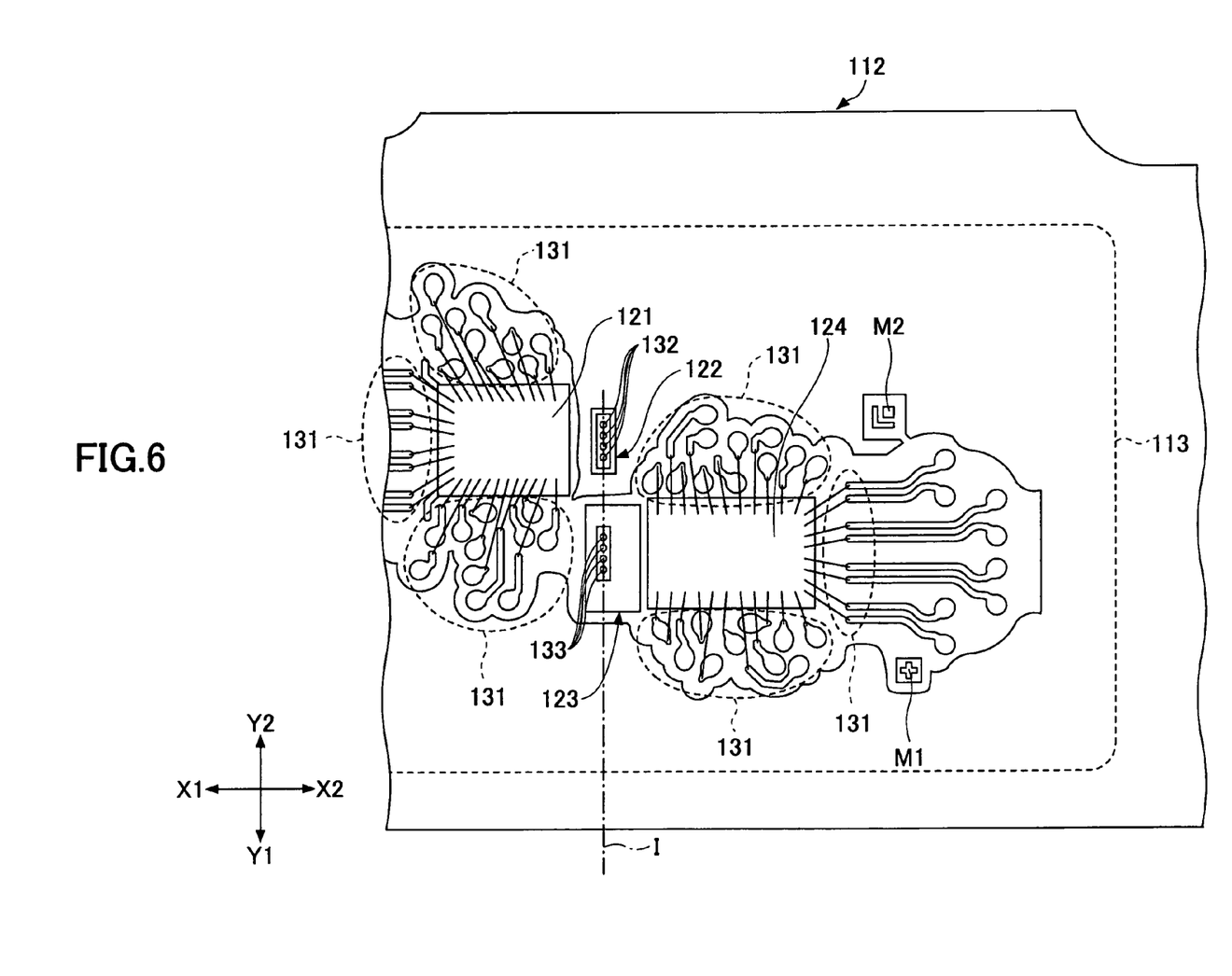
FIG. 6 is a schematic diagram of relevant parts of the circuit board.

FIG. 6 is a schematic diagram of relevant parts of the circuit board 112.

The driver IC 121 and the receiver IC 124 are configured of bare chips, and are directly wire-bonded to patterns 131 formed on the circuit board 112.

The driver IC 121 is connected to the light emitting element 122, and drives the light emitting element 122 according to signals received from the electric connector 111. The light emitting element 122 is configured with a vertical-cavity surface-emitting laser (VCSEL) diode including plural light emitting points 132 arranged linearly. The light emitting element 122 is arranged so that the light emitting points 132 are located on a predetermined axis I of the circuit board 112.

The light receiving element 123 is, e.g., a PD including plural light receiving points 133 arranged linearly. The light receiving points 133 convert light received from the waveguide array 113 to electric signals, and supply the electric signals to the receiver IC 124. The light receiving element 123 is arranged so that the light receiving points 133 are located on the predetermined axis I of the circuit board 112.

In the present embodiment, the light emitting points 132 of the light emitting element 122 and the light receiving points 133 of the light receiving element 123 are aligned in one row on the axis I. However, the emitting points 132 of the light emitting element 122 and the light receiving points 133 of the light receiving element 123 need not be aligned in one row; they can be arranged in two or more rows or in a matrix.

The receiver IC 124 amplifies electric signals received from the light receiving element 123, and supplies the amplified electric signals to the electric connector 111 via the balanced transmission pattern L.

The driver IC 121 is adjacent to the light emitting element 122, and is located in the direction indicated by the arrow X1 with respect to the predetermined axis I. The receiver IC 124 is adjacent to the light receiving element 123, and is located in the direction indicated by an arrow X2 with respect to the predetermined axis I, on the side opposite to the driver IC 121.

In the present embodiment, the driver IC 121 is located across the light emitting element 122 and the light receiving element 123 from the receiver IC 124, to reduce the layout area and the mounting area, and to suppress noise therebetween. However, the driver IC 121 and the receiver IC 124 can be adjacent to each other, arranged on the same side, so that the transmission distances of the driver IC 121 and the receiver IC 124 can be made equal. Accordingly, the impedance can be easily matched, which is advantageous for a high-speed balanced transmission line.

The circuit board 112 has plural positioning marks M1, M2 near the driver IC 121, the light emitting element 122, the light receiving element 123, and the receiver IC 124 for determining positions of the driver IC 121, the light emitting element 122, the light receiving element 123, the receiver IC 124, and the waveguide array 113.

The marks M1, M2 and the light emitting element 122 are recognized by an imager, the light emitting element 122 is positioned by using the marks M1, M2 as references, and is fixed to the circuit board 112. The light emitting points 132 of the light emitting element 122 are recognized by an imager, and the light receiving element 123 and the waveguide array 113 are positioned by using the light emitting points 132 of the light emitting element 122 as references.

Accordingly, the plural light emitting points 132 of the light emitting element 122 and the plural light receiving points 133 of the light receiving element 123 are arranged facing the edge surfaces of the waveguides of the waveguide array 113.

The driver IC 121, the light emitting element 122, the light receiving element 123, and the receiver IC 124 are arranged beneath the waveguide array 113, and the periphery of the waveguide array 113 is sealed by sealing resin. Thus, the driver IC 121, the light emitting element 122, the light receiving element 123, and the receiver IC 124 are shielded from outside, so that even bare chips can be protected from outside influences.

The power supply circuit 126 is arranged on an opposite surface of the circuit board 112, at a position corresponding to the driver IC 121, the light emitting element 122, the light receiving element 123, and the receiver IC 124. Therefore, the power supply circuit 126 is located close to the driver IC 121, the receiver IC 124, and the microcomputer 125.

The microcomputer 125 controls the driver IC 121 and the receiver IC 124 and adjusts the communication status and laser output in order to stabilize communications.

Figure 7:
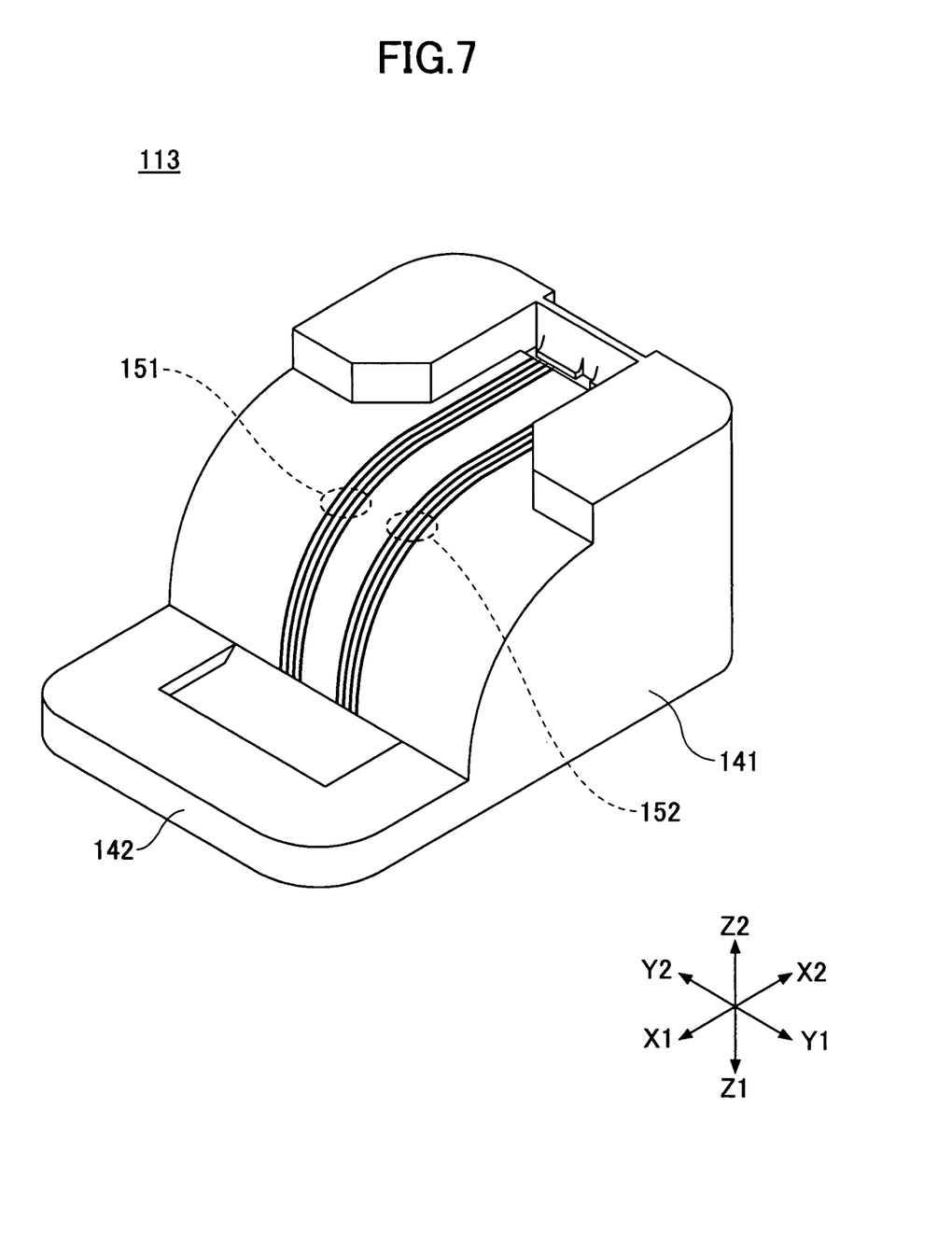
FIG. 7 is a perspective view of a waveguide array.
Figure 8A:
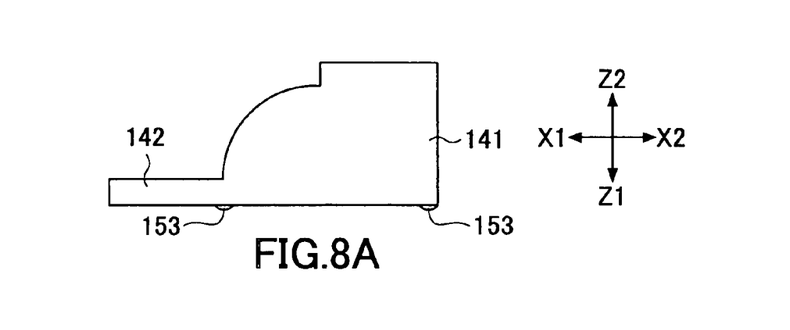
FIGS. 8A-8E are schematic diagrams of the waveguide array.
Figure 8B:
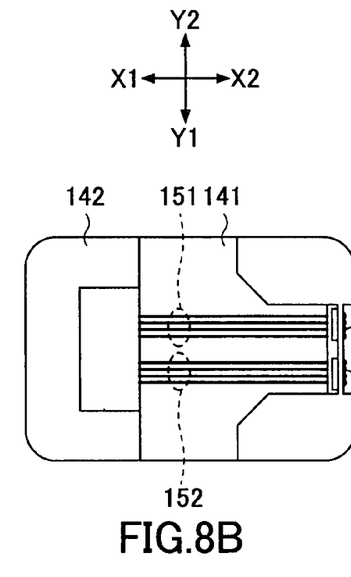
Figure 8C:
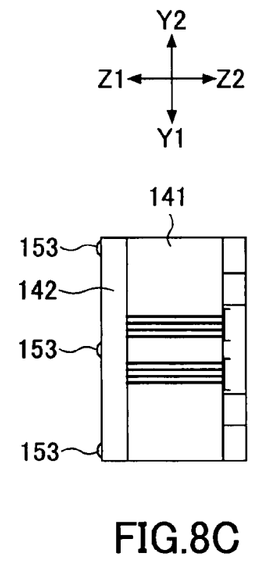
Figure 8D:
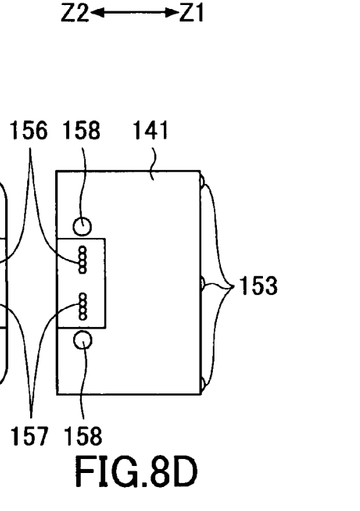
Figure 8E:
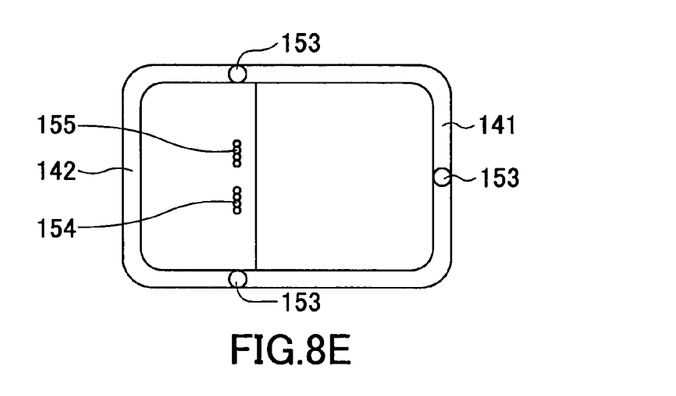

FIG. 7 is a perspective view of the waveguide array 113, and FIGS. 8A-8E are schematic diagrams of the waveguide array 113.

The waveguide array 113 is formed by molding transparent resin, and is configured of a waveguide body 141 and a flange part 142.

The waveguide body 141 is a substantially concave shape, in which the base side, i.e., the side of the direction indicated by an arrow Z1, is an aperture, and the top side, i.e., the side of the direction indicated by an arrow Z2, is a curved surface. The top curved surface of the waveguide body 141 includes a waveguide unit 151 including plural waveguides used for transmission and a waveguide unit 152 including plural waveguides used for reception. The curved surface is a substantially cylindrical surface, and the curvature thereof is specified such that light does not leak outside from the waveguide units 151, 152.

The waveguide units 151, 152 each include plural waveguides. Each waveguide of the waveguide units 151, 152 is arranged so that one end extends in a direction orthogonal to the circuit board 112, i.e., the direction indicated by the arrow Z1, and the other end extends in a direction parallel to the circuit board 112, i.e., the direction indicated by the arrow X2. The cross-sectional shapes of the waveguides of the waveguide units 151, 152 are squares having substantially 50 µm sides.

There are three protruding parts 153 provided on the rim of the base side of the waveguide body 141. Each protruding part 153 has a hemispherical shape. When the waveguide array 113 is mounted on the circuit board 112, the three protruding parts 153 abut on the circuit board 112. As the three protruding parts 153 abut on the circuit board 112, the contact area between the waveguide array 113 and the circuit board 112 is minimized. Accordingly, the waveguide array 113 can be slid on the circuit board 112. This facilitates the process of determining the position of the waveguide array 113.

Because of the protruding parts 153, a gap is formed between the circuit board 112 and the base side of the waveguide array 113 when the waveguide array 113 is mounted on the circuit board 112. This gap is sealed by sealing resin. Accordingly, the driver IC 121, the light emitting element 122, the light receiving element 123, and the receiver IC 124 are sealed inside.

Lens units 154, 155 are provided where the waveguide units 151, 152 meet the base side of the waveguide body 141. The lens units 154, 155 each include plural lenses. Surfaces of the lenses of the lens unit 154 have spherical shapes. Light beams emitted by the light emitting points 132 of the light emitting element 122 are condensed at these lenses and are incident on the edge faces of the waveguides of the waveguide unit 151. Surfaces of the lenses of the lens unit 155 have spherical shapes. The lens unit 155 causes light beams irradiated from the edge faces of the waveguides of the waveguide unit 152 to condense at the light receiving points 133 of the light receiving element 123.

The lens units 154, 155 are arranged opposite to the light emitting points 132 of the light emitting element 122 and the light receiving points 133 of the light receiving element 123, respectively.

Due to the protruding parts 153, the lens units 154, 155 of the waveguide array 113 can be spaced apart from the light emitting/receiving elements 122, 123 by precise distances.

The flange part 142 protrudes from the edge of the base in the direction indicated by the arrow X1 of the waveguide body 141. The driver IC 121 is arranged beneath the flange part 142.

Lens units 156, 157 are provided where the waveguide units 151, 152 meet the side surface of the waveguide body 141 in the direction indicated by the arrow X2. The lens units 156, 157 each include plural lenses.

On the side surface of the waveguide body 141 in the direction indicated by the arrow X2, holes 158 are formed on both sides of the lens units 156, 157. An optical connector attached to the end of an optical communication line engages with the holes 158, so that waveguides of the optical communication line face the lenses of the lens units 156, 157. The optical connector attached to the end of the optical communication line is inserted through the optical socket connector 114 and held by the housing 117.

Surfaces of the lenses of the lens unit 156 have spherical shapes. The lens unit 156 causes light beams irradiated from the edge faces of the waveguides of the waveguide unit 151 to condense at the edge face of the optical communication line. Surfaces of the lenses of the lens unit 157 have spherical shapes. The lens unit 157 causes light beams irradiated from the edge face of the optical communication line to condense at the edge face of the waveguide unit 152.

The above-described lens units 154, 155, 156, 157 can prevent diffusion and attenuation of light, so that communications are performed efficiently.

As described above, the waveguide array 113 can introduce light beams from the optical communication line to the circuit board 112, and also introduce light beams from the circuit board 112 to the optical communication line.

In the present embodiment, the receiver IC 124 is arranged beneath the waveguide body 141 and the driver IC 121 is arranged beneath the flange part 142; however, the driver IC 121 can be arranged beneath the waveguide body 141 and the receiver IC 124 can be arranged beneath the flange part 142.

The driver IC 121 and the receiver IC 124 can be arranged next to each other, and arranged together beneath the waveguide body 141 or the flange part 142.

Figure 9:
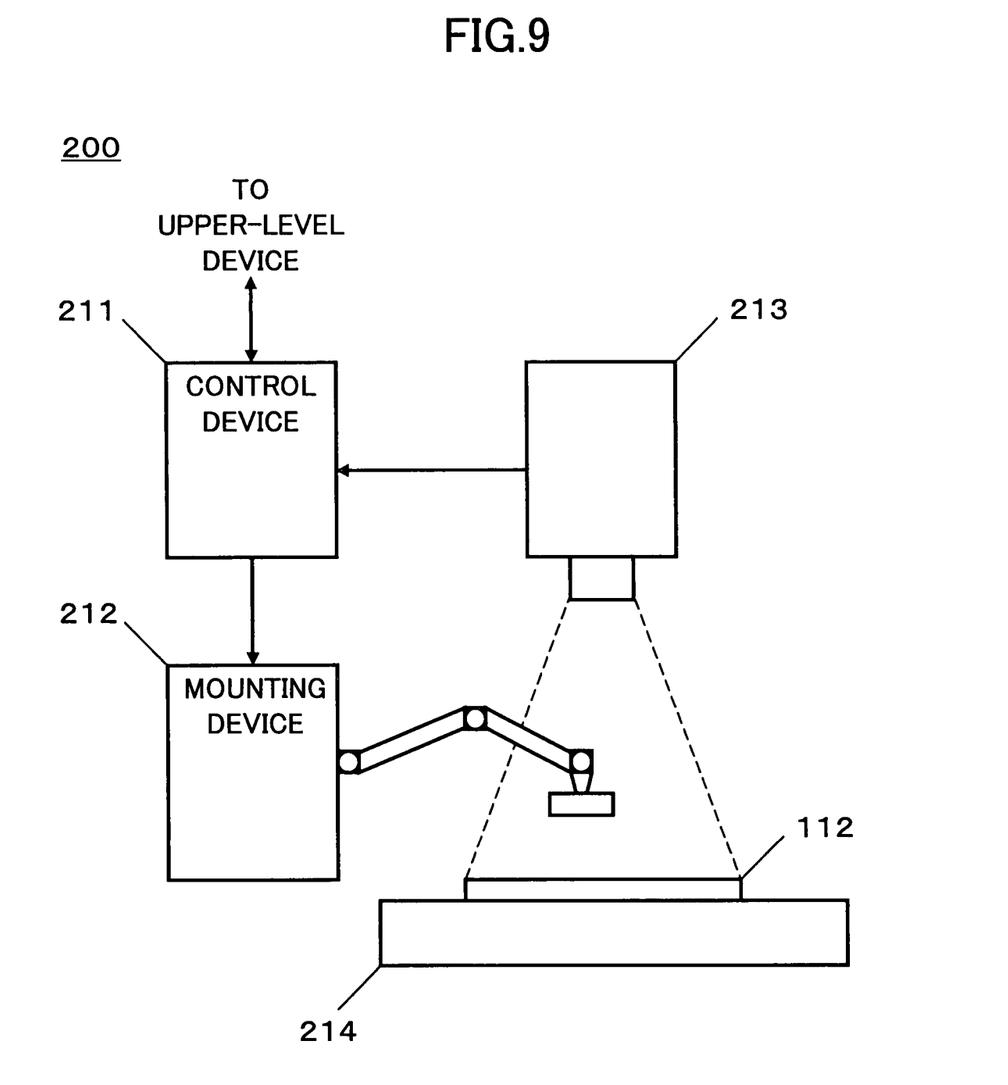
FIG. 9 is a block diagram of a mounting system.

FIG. 9 is a block diagram of a mounting system.

A mounting system 200 includes a control device 211, a mounting device 212, an imaging device 213, and a stage 214.

The control device 211 can communicate with an upper-level device, and acquires an image from the imaging device 213 according to a command from the upper-level device. Based on the acquired image, the control device 211 drives the mounting device 212 so as to mount the driver IC 121 for emitting light, the light emitting element 122, the light receiving element 123, the receiver IC 124 for receiving light, and the waveguide array 113 on the circuit board 112 mounted on the stage 214.

Figure 10:
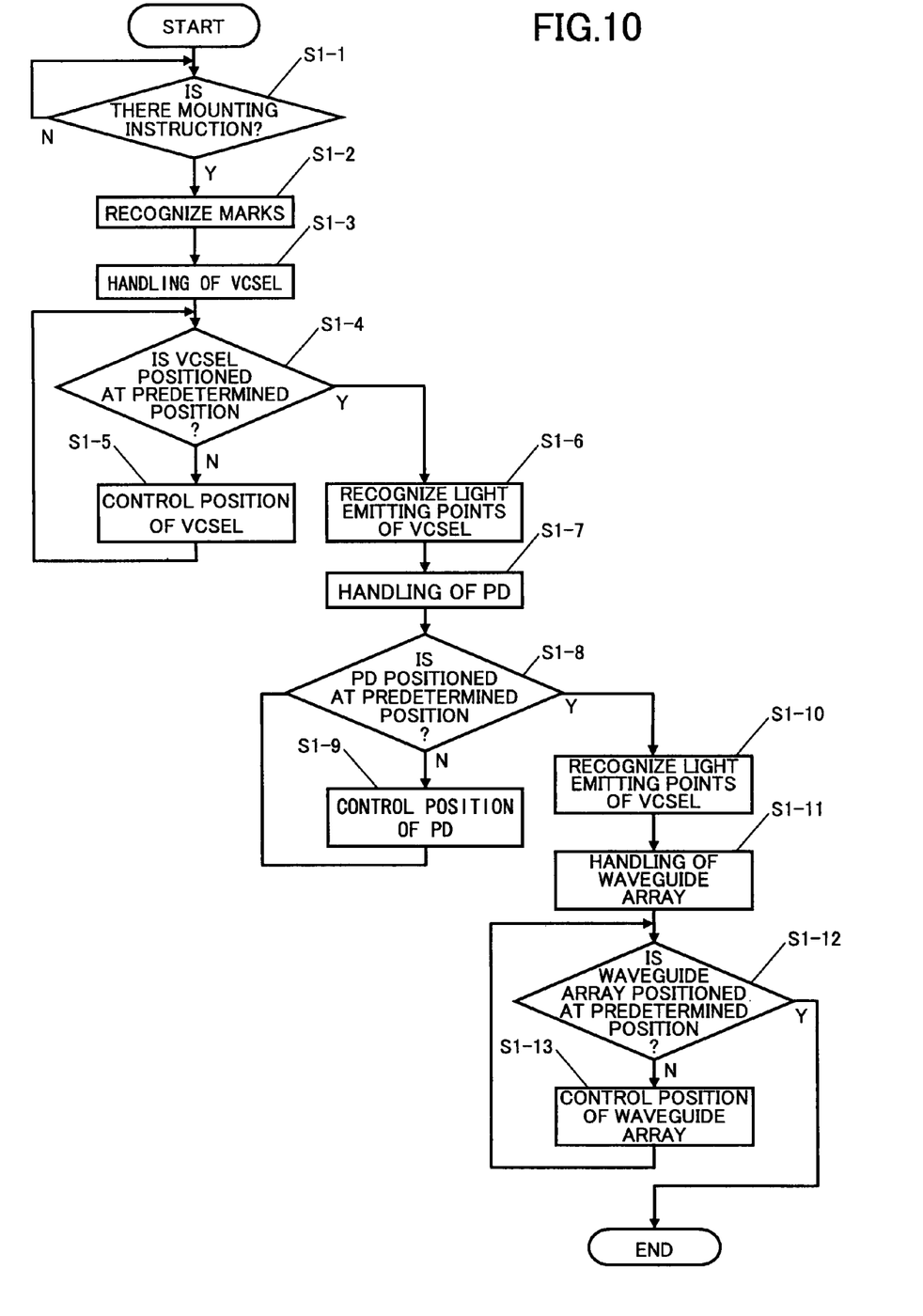
FIG. 10 is a flowchart of a process performed by a control device.

FIG. 10 is a flowchart of a process performed by the control device 211.

In step S1-1, the circuit board 112 is mounted on the stage 214, and the control device 211 receives a mounting instruction from the upper-level device. In step S1-2, the control device 211 causes the imaging device 213 to pick up an image of the circuit board 112, and recognizes the marks M1, M2 from the picked up image. Specifically, the control device 211 performs a process such as binarization on the picked up image, performs image analysis on the binarized image, and recognizes the marks M1, M2.

Next, the control device 211 recognizes the position at which the light emitting element 122 is mounted by using the recognized marks M1, M2 as reference coordinates. In step S1-3, the control device 211 controls the mounting device 212 to handle the light emitting element 122. In steps S1-4 and S1-5, the operation of controlling the position of the light emitting element 122 is continued until the light emitting element 122 is positioned at a predetermined position. The control device 211 analyzes images being picked up by the imaging device 213 to recognize the position of the light emitting element 122 from the shape of the light emitting element 122.

In step S1-6, the control device 211 causes the imaging device 213 to pick up images of the circuit board 112 to recognize the light emitting points 132 of the light emitting element 122 based on the picked up images. The control device 211 analyzes the images being picked up by the imaging device 213 to recognize the position of the light emitting points 132 of the light emitting element 122 from the shape of the light emitting element 122 and the shapes of the light emitting points 132. In step S1-7, the control device 211 controls the mounting device 212 to handle the light receiving element 123. In steps S1-8 and S1-9, the operation of controlling the position of the light receiving element 123 is continued until the light receiving element 123 is positioned at a predetermined position.

In step S1-10, the control device 211 causes the imaging device 213 to pick up images of the circuit board 112 to recognize the light emitting points 132 of the light emitting element 122 based on the picked up images. The control device 211 analyzes the images being picked up by the imaging device 213 to recognize the position of the light emitting points 132 of the light emitting element 122 from the shape of the light emitting element 122 and the shapes of the light emitting points 132. In step S1-11, the control device 211 controls the mounting device 212 to handle the waveguide array 113. In steps S1-12 and S1-13, the operation of controlling the position of the waveguide array 113 is continued until the waveguide array 113 is positioned at a predetermined position.

According to the present embodiment, images picked up by the imaging device 213 are analyzed to recognize the marks M1, M2 and the light emitting element 122 from shapes thereof. The light emitting element 122 is positioned by using the recognized marks M1, M2 as references. Accordingly, the light emitting element 122 can be precisely positioned on the circuit board 112. The imaging device 213 is caused to pick up images of the light emitting element 122 precisely positioned on the circuit board 112, the light emitting points 132 are recognized from the picked up images, and the light receiving element 123 is positioned by using the recognized light emitting points 132 as references. Accordingly, the light emitting points 132 and the light receiving points 133 of the light receiving element 123 can be positioned even more precisely.

Further, the imaging device 213 is caused to pick up images of the light emitting element 122 precisely positioned on the circuit board 112, the light emitting points 132 are recognized from the picked up images, and the waveguide array 113 is positioned by using the recognized light emitting points 132 as references. Accordingly, the lens units 154, 155 formed on the base side of the waveguide array 113 can be precisely positioned with respect to the light emitting points 132 of the light emitting element 122. Therefore, the lens units 154, 155 can be even more precisely positioned with respect to the light emitting units 132.

As a result, the light emitting points 132 of the light emitting element 122, the light receiving points 133 of the light receiving element 123, and the lens units 154, 155 of the light receiving points 133 can be precisely positioned.

By employing the mounting method according to the present embodiment, elements can be positioned relatively precisely with reduced errors. Furthermore, elements can be positioned and mounted while recognizing positions from images. Therefore, production can be performed at low cost.

After mounting the waveguide array 113, the periphery of the waveguide array 113 is sealed with sealing resin. Accordingly, the bare chips, namely the driver IC 121, the light emitting element 122, the light receiving element 123, and the receiver IC 124 can be sealed beneath the waveguide array 113, so that the elements and the ICs are protected.

The present embodiment describes a photoelectric conversion module including four lines for transmission and four lines for reception, to which the present invention is not limited. There can be one transmission line, or more transmission lines than described above. There is no constraint on the number of lines.

According to one embodiment of the present invention, elements of a photoelectric conversion module can be miniaturized, so that a photoelectric conversion module and a high-speed transmission connector can be made compact.

Further, according to one embodiment of the present invention, production efficiency is enhanced, and therefore, manufacturing is performed at low cost.

The present invention is not limited to the specifically disclosed embodiment, and variations and modifications may be made without departing from the scope of the present invention.

The present application is based on Japanese Priority Patent Application No. 2006-186883, filed on Jul. 6, 2006, Japanese Priority Patent Application No. 2006-186884, filed on Jul. 6, 2006, and Japanese Priority Patent Application No. 2006-186885, filed on Jul. 6, 2006, the entire contents of which are hereby incorporated by reference.

What is claimed is:

1. A method of assembling a photoelectric conversion module including one circuit board on which a light emitting element having one or more light emission points thereon, a light receiving element, and an optical element optically-connected to the light emitting element and the light receiving element are to be mounted, the method comprising:
   recognizing at least one positioning mark formed on the circuit board;
   determining a first position on the circuit board based on the recognized at least one positioning mark;
   mounting the light emitting element on the circuit board at the first determined position;
   recognizing a position of the one or more light emission points of the light emitting element mounted on the circuit board;

determining a second position on the circuit board based on the recognized position of the one or more light emission points;

mounting the light receiving element on the circuit board onto the second determined position;

determining a third position on the circuit board based on the recognized position of the one or more light emission points; and mounting the optical element on the circuit board at the third determined position.

2. The method according to claim 1, further comprising:
recognizing the first position,
recognizing a current position of the light emitting element, and
moving the light emitting element so that the current position thereof becomes the first position.

3. The method according to claim 1, further comprising:
recognizing the second position,
recognizing a current position of the light receiving element, and
moving the light receiving element so that the current position thereof becomes the second position.

4. The method according to claim 1, further comprising:
recognizing the third position,
recognizing a current position of the optical element, and
moving the optical element so that the current position thereof becomes the third position.

5. The method according to claim 1, wherein the determining the second position further comprises:
detecting an image of each of the one or more light emission points, analyzing the detected image to determine a position of each of the one or more light emission points, and positioning the light receiving element using the position of each of the one or more emission points as a reference.

6. The method according to claim 1, wherein determining the third position further comprises:
detecting an image of each of the one or more light emission points, analyzing the detected image to determine a position of each of the one or more light emission points, and positioning the optical element using the position of each of the one or more emission points as a reference.

* * * * *